United States Patent [19]

Watanabe et al.

[11] Patent Number: 4,792,864
[45] Date of Patent: Dec. 20, 1988

[54] APPARATUS FOR DETECTING RECORDED DATA IN A VIDEO TAPE RECORDER FOR AUDIENCE RATING PURPOSES

[75] Inventors: Fumio Watanabe, Zama; Yoshikazu Itoh, Tokyo, both of Japan

[73] Assignee: Video Research Limited, Tokyo, Japan

[21] Appl. No.: 879,800

[22] Filed: Jun. 27, 1986

[30] Foreign Application Priority Data

Sep. 3, 1985 [JP] Japan ................ 60-196487

[51] Int. Cl.[4] .............. H04N 5/782; H04N 5/91; H04N 7/10
[52] U.S. Cl. .................... 358/335; 358/84; 360/6; 360/33.1
[58] Field of Search ............. 358/335, 84, 141, 142, 358/257; 360/6, 10.1, 14.3, 33.1; 369/59

[56] References Cited

U.S. PATENT DOCUMENTS

| | | | |
|---|---|---|---|
| 4,163,254 | 7/1979 | Block et al. | 358/84 X |
| 4,163,255 | 7/1979 | Pires | 358/84 X |
| 4,225,884 | 9/1980 | Block et al. | 358/84 X |
| 4,230,990 | 10/1980 | Lert, Jr. et al. | 358/84 X |
| 4,258,386 | 3/1981 | Chenng | 358/84 |
| 4,396,947 | 8/1983 | Chenng | 358/84 X |
| 4,439,785 | 3/1984 | Leonard | 358/335 X |
| 4,547,804 | 10/1985 | Greenberg | 358/142 |
| 4,559,644 | 7/1986 | Fischer | 358/84 |
| 4,574,304 | 3/1986 | Watanabe et al. | 358/84 |
| 4,587,521 | 5/1986 | Ohta et al. | 358/142 X |
| 4,613,904 | 9/1986 | Lurie | 358/142 |
| 4,622,583 | 11/1986 | Watanabe et al. | 358/84 |
| 4,633,302 | 12/1986 | Damoci | 358/84 |
| 4,639,779 | 1/1987 | Greenberg | 358/142 |
| 4,642,685 | 2/1987 | Roberts et al. | 358/84 |
| 4,663,678 | 5/1987 | Blum | 360/72.2 |

Primary Examiner—Raymond F. Cardillo
Assistant Examiner—W. R. Young
Attorney, Agent, or Firm—Roberts, Spiecens & Cohen

[57] ABSTRACT

A system is disclosed for detecting the recording data of a video tape recorder, which is enabled to detect data concerning the time and channel a program played back was recorded at and through, by adding both calendar data such as the date and time and channel data indicating a channel to be recorded in the recording operation of the video tape recorder and by extracting the above-specified data in the playback operation.

1 Claim, 3 Drawing Sheets

Fig. 1
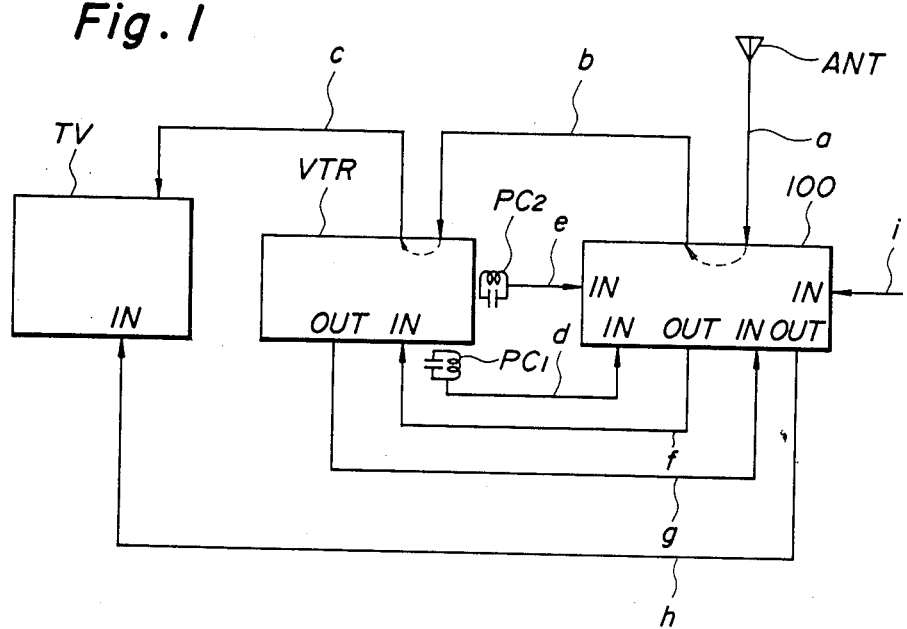
Fig. 4
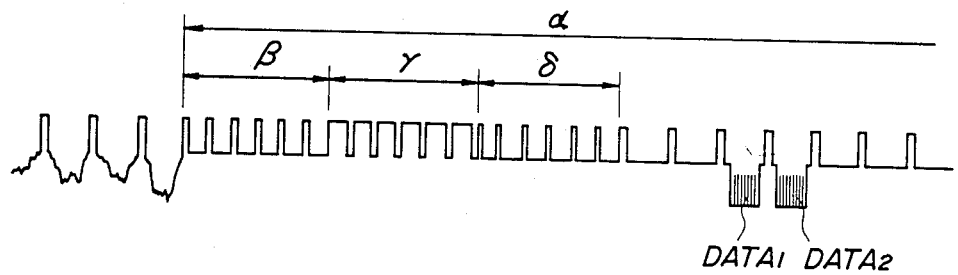
Fig. 5

APPARATUS FOR DETECTING RECORDED DATA IN A VIDEO TAPE RECORDER FOR AUDIENCE RATING PURPOSES

BACKGROUND OF THE INVENTION

The present invention relates to a program rating (audience rating) measuring system and, more particularly, to a system for detecting the recording data of a video tape recorder, which system is adapted to detect data concerning the time and channel when and where a program being played back by the video tape recorder was recorded.

In recent years, the use of video tape recorders has become widespread, and the importance of sampling data on the use of the video tape recorder has been increasing for accurately surveying TV program ratings.

Thus, in Japanese Patent Applications Nos. 58-71221 (1983/71221), 58-107896 (1983/107896), 58-107897 (1983/107897) (corresponding to U.S. Pat. No. 4,574,304) and 59-143052 (1984/143052) (corresponding to U.S. Pat. No. 4,622,583), we have already proposed methods and apparatus for detecting the operating states of the video tape recorder so that the audience situations may be grasped in case the video tape recorder is used in combination with a television set.

However, what can be surveyed by that prior art has been limited to date concerning how the video tape recorder is used in each instance, i.e., the data indicating the states of stop, playback, recording and monitoring (that a program selected by the tuner of the video tape recorder is being observed through a TV set) as well as the channel data indicating which channel is being recorded. The prior art has failed to detect what program is being played back for the actual observation, i.e., the time and channel when and where the program being viewed was recorded. Therefore, the prior art cannot provide a sufficient variety of data and is deficient as it cannot provide sufficient research concerning the program ratings of families using TV sets and video tape recorders together.

SUMMARY OF THE INVENTION

The present invention has been conceived in view of the background thus far described and has as an object a system for detecting the recording data of a video tape recorder, which can detect not only the operating states of the video tape recorder but also which time and on what channel a program being played back was recorded.

BRIEF DESCRIPTION OF THE DRAWINGS

FIG. 1 is a block diagram showing the connections to a meter, to which the present invention is applied, of a television set and a video tape recorder;

FIG. 4 is a diagram showing the positions of a video signal, into which data are to be inserted; and FIG. 5 is a diagram showing one example of the structure of the data.

DESCRIPTION OF THE PREFERRED EMBODIMENT

Figure 2:
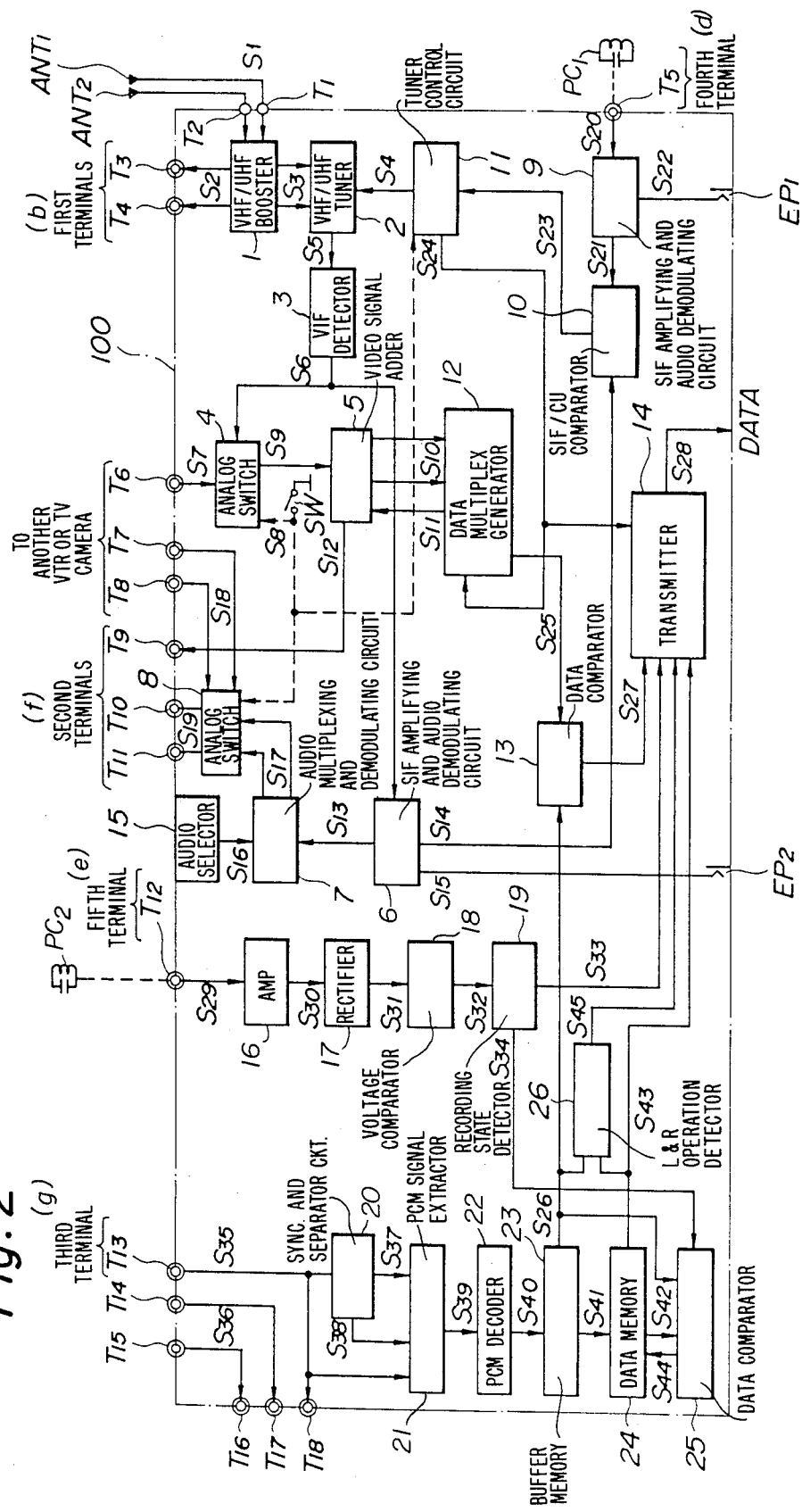
FIG. 2 is a block diagram showing the internal structure of the meter of FIG. 1.

FIG. 1 shows the connection of a meter 100, to which a system for detecting recording data of a video tape recorder according to the present invention is applied, to a television set TV and a video tape recorder VTR. Here, a device for surveying program ratings is to be attached to a TV set in a selected family, and it is therefore devised in various manners in the present invention without modifying the inside of TV set as far as possible. For example, except for pickup coils $PC_1$ and $PC_2$ disposed in the video tape recorder VTR, the individual units can be connected through connecting cables. Moreover, the pickup coils $PC_1$ and $PC_2$ need not be soldered but may merely be disposed in the vicinity of the circuit.

The structure will be described with reference to FIG. 1. An antenna ANT is connected directly with the meter 100, which boosts a space signal a and feeds it to an internal tuner and a branched space signal b to the antenna terminal of the video tape recorder VTR, and the antenna output terminal of the video tape recorder VTR is connected to the antenna terminal of the television set TV. Incidentally, a signal c at the antenna output terminal of the video tape recorder VTR contains not only the space signal but also a signal which is modulated to an unused channel such as the 2nd channel.

In the video tape recorder VTR, on the other hand, there are disposed both the pickup coil $PC_1$ for detecting an audio intermediate-frequency signal (SIF) and the pickup coil $PC_2$ for detecting an erase signal generated in the recording operation, and detected signals d and e are introduced into the meter 100 so that the audio intermediate-frequency signal d detected by the pickup coil $PC_1$ may be used for judging the channel received by the tuner in the video tape recorder VTR whereas the erase signal e detected by the pickup coil $PC_2$ may be used for judging that the video tape recorder VTR is in a recording state. Incidentally, the judgement of the recording state can be also conducted by another method such as by detecting an FM brightness signal (i.e., a video signal having been subjected to FM modulation so that it may be recorded on a video tape), which is generated by the recording circuit of the video tape recorder VTR.

Next, a video/audio signal f output from the meter 100 is applied to an external input terminal of the video tape recorder VTR (namely, the signal f can be switched by means of a conventional slide switch of the video tape recorder in case the recorder uses the external input terminal), and a video/audio signal g output from the video tape recorder VTR is input to the meter 100. This constitutes the characteristic feature of the present invention. According to the present invention, more specifically, the recording operation is conducted not by using the signal received by the internal tuner of the video recorder VTR but the signal received by the internal tuner of the meter 100 as the signal to be recorded, by demodulating the signal received by the internal tuner of the meter 100 into a video signal and an audio signal, by adding to the video signal both calendar data indicating the date, the time etc. and channel data indicating what channel the program is recorded from, and by applying the signals to the external input terminal of the video tape recorder VTR. Generally speaking, it is very difficult to mix the data into the signals of the internal tuner of the video tape recorder VTR without modifying the hardware of the video tape recorder VTR. That mixing operation, however, makes it possible to insert the data with ease. Incidentally, since the internal tuner of the meter 100 is always tuned to the same channel as that of the internal tuner of the video tape recorder VTR on the basis of the audio intermediate-frequency signal d detected by the pickup coil $PC_1$, the operation can be performed like the normal recording operation without any consciousness of the presence of the meter 100 by means of a channel selecting button or the like on the video tape recorder VTR.

On the other hand, at playback, the video/audio signal g output from the video tape recorder VTR is used to take out the calendar data and channel data recorded. On the video tape and to detect what time and from what channel the program was recorded, and the extraction and decoding of the data are conducted in the meter 100. Incidentally, since the signal g has already been demodulated into the video signal and the audio signal, it is returned as the signal h from the meter 100 to the television set TV and is applied to an AV terminal of the television set TV so that the playback image may be observed. Despite this, however, the path of the signal h is not necessary in case the observation is conducted with the signal which was modulated to the unused channel through the antenna terminal from the video tape recorder VTR.

On the other hand, a signal i to be input to the meter 100 indicates what is coming from another video tape recorder or a television camera and is usually used less frequently. Since the video/audio signal input terminal (i.e. the external input terminal) of the video tape recorder VTR is occupied for feeding the recording signal from the meter 100, more specifically, there is no terminal to be inserted in case dubbing is to be effected or a television camera is to be used. In this case, however, the connection is made not with the video/audio signal input terminal of the video tape recorder VTR but with a terminal in the meter 100. Incidentally, in case the dubbing is to be conducted by another video tape recorder or in case the recording operation is conducted by a television camera, the aforementioned channel data are replaced by a signal indicating that particular case.

Next, FIG. 2 shows details of the internal structure of the meter 100 of FIG. 1. Here, as shown in the figure, the antenna is divided into independent VHF and UHF antennas, and the demodulated audio signal is divided into two right and left signals so that it may satisfy stereophonic or bilingual broadcasting purposes. Reference characters $T_1$ and $T_2$ indicate the antenna input terminals of the meter 100; characters $T_3$ and $T_4$ terminals connected with the antenna input terminal of the video tape recorder VTR; characters $T_5$a a terminal to be connected with the pickup coil $PC_1$; characters $T_6$, $T_7$ and $T_8$ terminals to be connected with another video tape recorder or a television camera; characters $T_9$, $T_{10}$ and $T_{11}$ terminals to be connected with the external input terminal of the video tape recorder VTR; character $T_{12}$ a terminal to be connected with the pickup coil $PC_2$; characters $T_{13}$, $T_{14}$ and $T_{15}$ terminals to be connected with the video/audio output terminal of the video tape recorder VTR; and characters $T_{16}$, $T_{17}$ and $T_{18}$ terminals to be connected with the AV terminal of the television set TV.

In FIG. 2, antennas $ANT_1$ and $ANT_2$ are connected through the terminals $T_1$ and $T_2$ with the input terminals of a VHF/UHF booster 1, which has one output $S_2$ connected through the terminals $T_3$ and $T_4$ with the antenna terminal of the video tape rercorder VTR and its other output $S_3$ connected with the antenna terminal of a VHF/UHF tuner 2 inside of the meter. Moreover, this VHF/UHF tuner 2 has its tuning controlled, as will be described hereinafter, by a tuner scanning control circuit 11 to the same channel as that of the internal tuner of the video tape recorder VTR.

Next, an output $S_5$ of the VHF/UHF tuner 2 is connected with the input terminal of a VIF (i.e., video intermediate-frequency) detecting AGC (i.e., automatic gain control) circuit 3, and a video signal $S_6$ detected by that VIF detecting AGC circuit 3 is connected with both the input terminals of an analog switch 4 and an SIF (i.e. sound intermediate-frequency) amplifying and audio demodulating circuit 6. Here, the analog swich 4 is paired with another analog switch 8 lying in the path of the audio signal and is used to switch the video signal and audio signal to be fed to a succeeding circuit in the dubbing operation or when the television camera is used, to the signals input from the terminals $T_6$, $T_7$ and $T_8$. The analog switch 4 and 8 switches the signal paths when the plug is connected with the terminals $T_6$, $T_7$ and $T_8$ by a switch SW for detecting dubbing or the like attached to one of the terminals $T_6$, $T_7$ and $T_8$.

Next, the output $S_9$ of the analog switch 4 is added in a video signal adder 5 to the calendar data and the channel data given by a data multiplex generator 12 so that the output $S_{12}$ of the video signal adder 5 is connected through the terminal $T_9$ to the external input terminal of the video tape recorder VTR. On the other hand, the output $S_{13}$ of the SIF amplifying and audio demodulating circuit 6 is demodulated through an audio multiplexing and demodulating circuit 7 to the two right and left audio signals $S_{17}$ and is connected together with the video signal $S_{12}$ of the aforementioned video signal adder 5 through the analog switch 8 and the terminals $T_{10}$, $T_{11}$ and $T_9$ with the external input terminals of the video tape recorder VTR. Incidentally, a demodulated audio signal $S_{15}$ can be taken out from the SIF amplifying and audio demodulating circuit 6 through an earphone terminal $EP_2$ so that the operating state of the circuit can be tested. Moreover, a block 15 indicates an audio control panel for switching or selecting the right and left stereophonic signals or selecting bilingual signals in the case of audio multiplex broadcasting.

Figure 3:
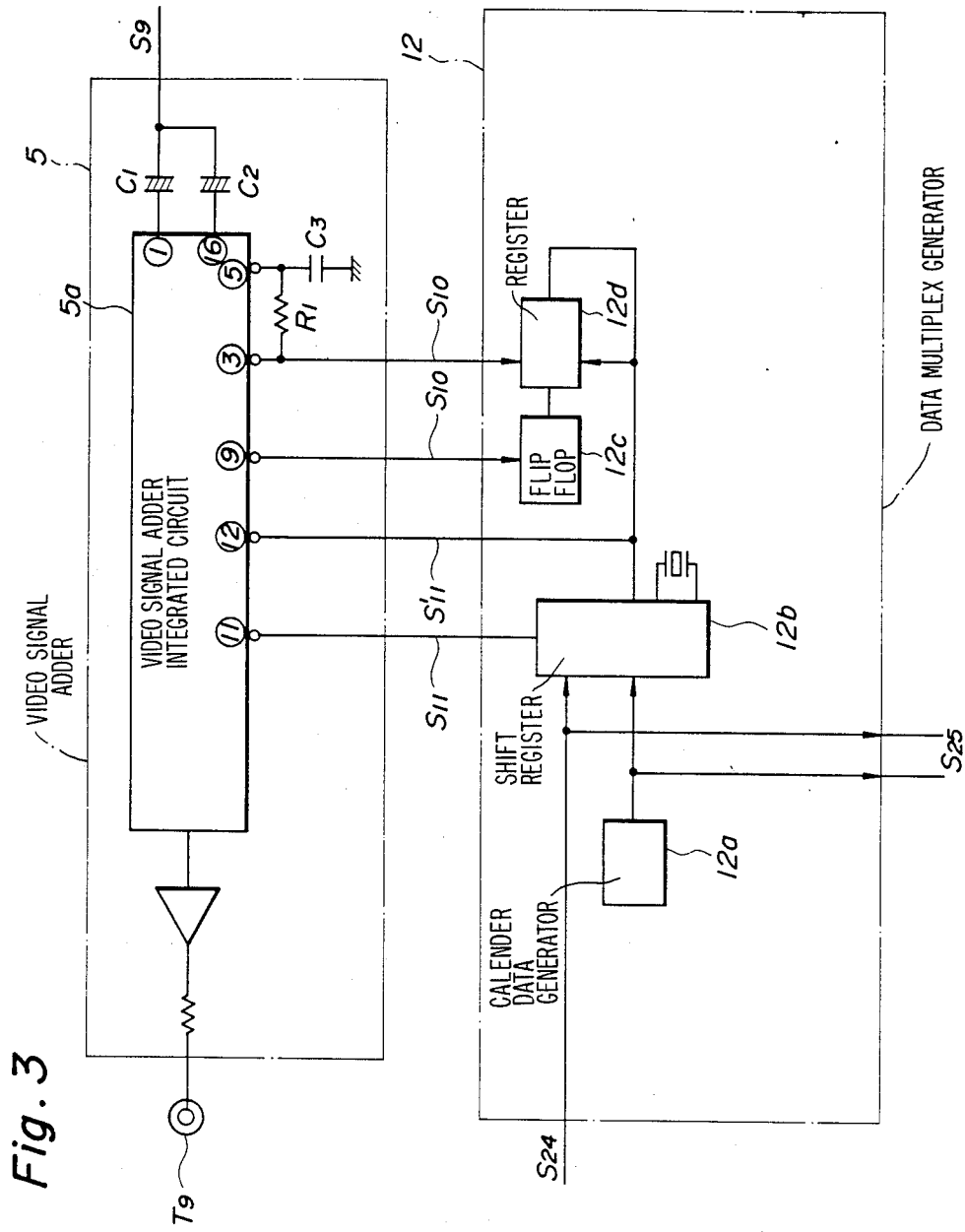
FIG. 3 is a circuit diagram showing details of a data multiplex generator and a video signal adder of FIG. 2.

FIG. 3 shows details of the video signal adder 5 and the data multiplex generator 12 of FIG. 2. The video signal adder 5 is constructed of a video signal adding integrated circuit 5a (e.g., "NJM2207") and has a function to add the signals $S_{11}$ and $S_{11}'$, which are applied to a letter offset check terminal ⑪ and a letter control terminal ⑫, as the PCM signals to the video signal $S_9$ which has been applied to terminals ① and ⑯ through capacitors $C_1$ and $C_2$. Incidentally, terminals ③, ⑤ and ⑨ are used for extracting synchronous signals from the video signal. On the other hand, the data multiplex generator 12 is constructed of: a calendar data generator 12a for generating the calendar data composed of the date and the time; a shift register 12b for serially transforming a channel data signal $S_{24}$ given by the tuner control scanning circuit 11 and calendar data signals fed from the calendar data generator 12a to send out the transformed signals to the video signal adding integrated circuit 5a; and a flip-flop 12c and a register 12d for determining the position, in which the PCM data are to be inserted, from the synchronous signal obtained from the video signal adding integrated circuit 5a.

FIG. 4 shows a portion of the video signal after the data have been added thereto. PCM data $DATA_1$ and $DATA_2$ are inserted in the sequence of several pulses after an equivalent period $\beta$, a vertical synchronizing period $\gamma$ and an equivalent period $\delta$ for a vertical blanking period $\alpha$. On the other hand, FIG. 5 shows an example of the data type, in which the calendar data and the channel data are suitably arrayed. Incidentally, it is quite natural that the position for insertion of the data and the type of the data be not especially limited.

Reverting to FIG. 2, the remaining construction will be described in the following. A signal $S_{20}$ of the pickup coil $PC_1$, which is to be applied to the terminal $T_5$, is fed through an SIF amplifying and audio demodulating circuit 9 to one input terminal of an SIF/CH comparator (i.e., audio intermediate-frequency and channel comparing circuit) 10, in which it is compared with an audio intermediate-frequency signal $S_{14}$ fed from the aforementioned SIF amplifying and audio demodulating circuit 6 so that the identity of the broadcast programs received by the inside tuner of the video tape recorder VTR and the VHF/UHF tuner 2. Moreover, a demodulated audio signal $S_{22}$ can be taken out from the SIF amplifying and audio demodulating circuit 9 through an earphone terminal $EP_1$ so that the operating state of the circuit can be tested. Incidentally, since the audio intermediate-frequency signal belongs to an FM signal having a constant amplitude, it has been confirmed that the comparison can be facilitated to ensure a sufficiently precise judgement. Still moreover, the identity of the received channels can be judged by another judging means such as the means using the video intermediate-frequency signal or the means using the demodulated audio signal, and these means can be suitably altered.

Next, the SIF/CH comparator 10 outputs a signal $S_{23}$ indicating the consistency or inconsistency from the compared result of the two signals to the tuner scanning control circuit 11 so that the station selecting voltage of the VHF/UHF tuner 2 is periodically varied until the two signals becomes coincident. By this operation, however, the received channel of the VHF/UHF tuner 2 is caused to follow that of the internal tuner of the video tape recorder VTR so that the two tuners receive an identical channel in the steady state of the operation. Moreover, the channel data signal $S_{24}$ according to the station selecting state is output from the tuner scanning control circuit 11 and is fed to the aforementioned data multiplex generator 12. Incidentally, the tuner scanning control circuit 11 is fed with the signal of the aforementioned switch SW for detecting dubbing or the like, and the data indicating the recording by the dubbing are output in place of the channel data indicating the channel of the tuner in case the dubbing is conducted from another video tape recorder or in case a television camera is used.

On the other hand, the erase signal of the video tape recorder VTR, which has been detected by the pickup coil $PC_2$, is fed from the terminal $T_{12}$ through an erase signal amplifier 16, a rectifier 17, a voltage comparator 18 and a recording state detector 19 so that a signal $S_{33}$ indicating the recording state is produced.

On the other hand, the terminals $T_{13}$, $T_{14}$ and $T_{15}$ are fed with the signals from the video/audio output terminals of the video tape recorder VTR to output the video and audio signals being recorded in the recording operation and the video and audio signals being played back in the playback operation. Thus, only the PCM signal is extracted from a video signal $S_{35}$, which is obtained from the terminal $T_{13}$, by a vertical blanking PCM signal extractor 21 at a timing obtained from a synchronizing and separating circuit 20 and is decoded to the original data by a PCM decoder 22. The output $S_{40}$ of the PCM decoder 22 is stored in a buffer memory 23, the output $S_{26}$ of which is compared in a data comparator 25 with the output $S_{42}$ of the data memory 24 so that the content of the buffer memory 23 is written in a data memory 24 when the two outputs take different values. Since the PCM data appear with the same period as that of the vertical synchronizing signal, more specifically, sixty groups of data arrive for one second, and it is meaningless to write them in the data memory 24 upon each arrival. Therefore, the change in the data is detected by the data comparator 25, whereupon the introduction of the data is conducted by feeding a signal $S_{44}$ to the data memory 24.

Moreover, the output $S_{26}$ of the buffer memory 23 is always compared in a data comparator 13 with the data $S_{25}$ of the data multiplex generator 12, and a signal $S_{27}$ indicating the playback state is output, assuming that the playback is being conducted in the case of inconsistency. In case the video tape recorder VTR is in a recording or standby state, more specifically, signals mixed with the data must be attained simultaneously at the terminals $T_{13}$, $T_{14}$ and $T_{15}$ from the meter 100. It is therefore possible to judge that the playback is being conducted in the inconsistency case. Incidentally, in case no data exist in the signals which are obtained from the video tape recorder VTR through the terminals $T_{13}$, $T_{14}$ and $T_{15}$, it is possible to judge that the tape has been recorded by another video tape recorder or that the software has been commercially purchased.

At the output $S_{26}$ of the buffer memory 23 and the output $S_{43}$ of the data memory 24, on the other hand, there is disposed a fast forward/rewind/pause detector 26 by which whether the operation belongs to the normal playback or another such as fast forwarding, rewinding or pause is judged from the changing data of the sequentially changing data. By incorporating even the seconds into the calendar data, more specifically, the operation is judged to be: normal playback in case the arriving data increase roughly every one second while containing more or less errors; fast forwarding in case the change of the data per second is faster; rewinding in case the data per second decrease; and pause in case the data per second remain unchanged.

On the other hand, the channel data $S_{24}$ having been judged by the tuner scanning control circuit 11, the signal $S_{27}$ having been detected by the data comparator 13 and indicating the playback state, the signal $S_{33}$ having been detected by the recording state detector 19 and indicating the recording state; a signal $S_{45}$ having been detected by the fast forward/rewind/pause detector 26 and indicating the fast forwarding, rewinding or pause, and the recording data $S_{43}$ having been output from the data memory 24 are input altogether to a transmitter 14 and are subjected to a suitable data processing so that the processed data are sent out to a data transmitting unit not shown in the drawing. In actual program rating surveys, incidentally, not only those data but also the channel data of the television set TV, on/off data, and data on the survey time and so on are required, but data of the existing system can be applied in place.

As has been described hereinbefore, according to the present invention, the data concerning the time and the channel a program being played back was recorded can be attained although it is impossible in the prior art. As a result, there can be attained an effect that it is possible to make program rating surveys more precisely in families where the television sets and the video tape recorders are used in combination.

What is claimed is:

1. Apparatus for detecting recorded and reproduction states of a video tape recorder for supplying audience rate data therefrom, comprising:

a meter connected to a video tape recorder;

a first pickup coil coupled to the video tape recorder for detecting an audio intermediate frequency signal from said video tape recorder;

a second pickup coil coupled to the video tape recorder for detecting an erase signal from said video tape recorder;

means including a first terminal on said meter connected to an antenna terminal of said video tape recorder for supplying boosted television signals to the video tape recorder;

means including a second terminal on said meter connected with an external input terminal of said video tape recorder for supplying video and audio signals to the video tape recorder;

means including a third terminal on said meter connected to an external output terminal of said video tape recorder for receiving video and audio signals from said video tape recorder;

means including a fourth terminal on said meter connected to said first pickup coil for receiving audio intermediate frequency signals from said video tape recorder;

means including a fifth terminal on said meter connected to said second pickup coil for receiving erase signals from said video tape recorder;

said means for supplying boosted television signals to the video tape recorder comprising a booster boosting television signals input from an external antenna and supplying the boosted signals to said first terminal and to a tuner in said meter;

said tuner supplying output video intermediate frequency signals and channel data;

video intermediate frequency detecting automatic gain control means for receiving the output signals from said tuner and producing output video signals;

audio intermediate frequency amplifying audio demodulating means receiving said video signals from said video intermediate frequency detecting automatic gain control means and producing output audio signals at said second terminal and output audio intermediate frequency signals;

data generating means for generating calendar data consisting of year, month, day, hour and minute and for memorizing channel data produced by said tuner;

video signal adding means coupled to said data generating means for supply of channel and calendar data therefrom to said second terminal during the vertical flyback line erasing period of the video signal input from said video intermediate frequency detecting automatic gain control means;

a second audio intermediate frequency amplifying audio demodulating means for receiving and amplifying video tape recorder audio intermediate frequency signals at said fourth terminal;

tuner scanning controlling means receiving the outputs of said first and second audio intermediate frequency amplifying audio demodulating means for scanning said outputs and selecting stations on said tuner which coincide with selected stations on the video tape recorder and supplying the channel data to said data generating means;

data extracting means for extracting and memorizing channel and calendar data from said video signal input at said third terminal;

data comparing means receiving channel and calendar data from said extracting means, and channel and calendar data from said data generating means for comparing both data and, when they coincide producing an output signal representing reproduced information;

recorded picture detecting means processing the erase signal of said video tape recorder at said fifth terminal and detecting recorded picture information; and transmitter means for receiving recorded picture information from said recorded picture detecting means, reproduced information from said data comparing means and channel and calendar data from said data generating means and delivering the same as audience rate data to a telephone circuit.

* * * * *